(12) United States Patent
Iizuka

(10) Patent No.: US 10,838,080 B2
(45) Date of Patent: Nov. 17, 2020

(54) RADIOGRAPHIC IMAGE CAPTURING APPARATUS

(71) Applicant: SHARP KABUSHIKI KAISHA, Sakai (JP)

(72) Inventor: Kunihiko Iizuka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/384,236

(22) Filed: Apr. 15, 2019

(65) Prior Publication Data

US 2019/0331805 A1 Oct. 31, 2019

(30) Foreign Application Priority Data

Apr. 26, 2018 (JP) .................................. 2018-085765

(51) Int. Cl.
*G01T 1/17* (2006.01)
*H04N 5/32* (2006.01)
*H04N 5/376* (2011.01)
*H04N 5/378* (2011.01)

(52) U.S. Cl.
CPC ................ *G01T 1/17* (2013.01); *H04N 5/32* (2013.01); *H04N 5/376* (2013.01); *H04N 5/378* (2013.01)

(58) Field of Classification Search
CPC . G01T 1/17; H04N 5/32; H04N 5/376; H04N 5/378
See application file for complete search history.

(56) References Cited

U.S. PATENT DOCUMENTS

| 4,957,659 | A | * | 9/1990 | Arques | .................. | H04N 5/374 |
| | | | | | | 250/208.1 |
| 2005/0270394 | A1 | * | 12/2005 | Dierickx | ............ | H04N 5/37452 |
| | | | | | | 348/308 |
| 2011/0058080 | A1 | * | 3/2011 | Egawa | ................. | H04N 5/3535 |
| | | | | | | 348/296 |
| 2016/0094798 | A1 | * | 3/2016 | Chappo | .................. | A61B 6/035 |
| | | | | | | 348/244 |

FOREIGN PATENT DOCUMENTS

| JP | H02-003970 A | 1/1990 |
| JP | 2011-061315 A | 3/2011 |
| WO | 2017/013963 A1 | 1/2017 |

\* cited by examiner

*Primary Examiner* — Chih-Cheng Kao
(74) *Attorney, Agent, or Firm* — ScienBiziP, P.C.

(57) ABSTRACT

A radiographic image capturing apparatus includes a substrate in which pixels are arranged in a matrix, the pixels each including a sensor element for generating an electrical signal corresponding to a dose of an incident radiation, a read transistor for outputting the electrical signal, and a reset transistor for performing initialization, and a shift register that outputs a control signal for sequentially selecting pixels of each row, in which a control signal used to control read transistors in pixels of a row and a control signal used to control reset transistors in pixels of another row are identical.

6 Claims, 6 Drawing Sheets

RADIOGRAPHIC IMAGE CAPTURING APPARATUS

BACKGROUND

1. Field

The present disclosure particularly relates to a radiographic image capturing apparatus using X-rays.

2. Description of the Related Art

The radiographic image capturing apparatus includes a sensor element that outputs an electrical signal (electrical charge) generated according to an incident radiation, particularly a dose of X-rays. As such a sensor element, a direct conversion type element in which X-rays are directly converted into an electrical signal, or an indirect conversion type element in which X-rays are converted into light by a scintillator and then converted into an electrical signal by a photoelectric conversion element is generally used. A panel for a radiographic image capturing apparatus in which such a sensor element is provided for each pixel of a plurality of pixels arranged in a two-dimensional matrix on a substrate (hereinafter, referred to as a panel) is also developed.

In such a panel, for example, a thin film transistor (TFT) element (hereinafter, referred to as a TFT element) is used for controlling each pixel as a switching element. In any of the direct conversion type element and the indirect conversion type element, the electrical signal (electrical charges) generated according to the dose of X-rays are accumulated in capacitance in each pixel.

A form in which the accumulated electrical signal (electrical charge) is transferred to an amplifier outside the panel through the TFT element is called a passive pixel type element. A passive pixel type radiographic image capturing apparatus is already widely put to practical use as a digital X-ray image capturing apparatus.

On the other hand, a form in which the accumulated electric signal (electrical charge) is amplified by using the TFT element is used as an amplification element, that is, using an amplifier transistor provided for each pixel and transmitted to a circuit outside the panel is called an active pixel type element. Since the active pixel type radiographic image capturing apparatus can reduce the influence of thermal noise of an output line and noise of a read circuit outside the panel, the active pixel type radiographic image capturing apparatus is also being developed.

In the active pixel type or passive pixel type radiographic image capturing apparatus, a read signal generation circuit for controlling reading (outputting) of a detection electrical current from each pixel and a reset signal generation circuit for controlling resetting after signal reading of each pixel are provided. An attempt to reduce a circuit scale of the read signal generation circuit and reset signal generation circuit is made in order to suppress an increase in manufacturing cost, an increase in an area of a peripheral region other than an imaging effective area, an increase in a size of the radiographic image capturing apparatus, and the like.

For example, in International Publication No. 2017/013963 (published on Jan. 26, 2017) discloses that a circuit scale of the read signal generation circuit and the reset signal generation circuit is reduced by reducing shift registers that respectively constitute the read signal generation circuit and the reset signal generation circuit.

In the radiographic image capturing apparatus disclosed in International Publication No. 2017/013963, resetting of a pixel is performed in a frame different from a frame in which a signal is read from the pixel. For that reason, there is inconvenience that it takes a long time for an imaging operation to repeatedly perform reading of the signal from the pixel and resetting of the pixel and processing speed of the radiographic image capturing apparatus is lowered.

It is desirable to improve the processing speed of the radiographic image capturing apparatus.

SUMMARY

According to an aspect of the disclosure, there is provided a radiographic image capturing apparatus including a substrate in which pixels are arranged in a matrix, the pixels each including a sensor element for generating an electrical signal corresponding to a dose of an incident radiation, a first switching element for outputting the electrical signal, and a second switching element for performing initialization, and a control signal output circuit that outputs a control signal for sequentially selecting pixels of each row, in which a control signal used to control first switching elements in pixels of a row and a control signal used to control second switching elements in pixels of another row are identical.

DESCRIPTION OF THE EMBODIMENTS

Hereinafter, embodiments of the present disclosure will be described in detail with reference to the drawings. However, the material, shape, relative arrangement, processing method, and the like of the configuration described in the embodiments are merely examples, and a scope of the present disclosure is not allowed to be limitedly interpreted by these. Furthermore, the drawings are schematic, ratios of the dimensions and shapes are different from the actual ones.

In the following description, as an example of the radiographic image capturing apparatus, an active pixel type radiographic image capturing apparatus will be described as an example. However, it goes without saying that the present disclosure is not limited to the active pixel type radiographic image capturing apparatus. In a passive pixel type radiographic image capturing apparatus, for example, in a case where a sensor element of a metal insulator semiconductor (MIS) type is used as a photoelectric conversion element, it goes without saying that the present disclosure is also applicable to a case where a reading switching element and a reset switching element are provided in each pixel.

In the following description, only the case where the pixels are arranged in a matrix with 4 rows and 4 columns will be described as an example. However, it goes without saying that the number of pixels may be appropriately changed.

Embodiment 1

When description is made on Embodiment 1 of the present disclosure with reference to FIGS. 1 to 3, the description is as follows.

Configuration of Radiographic Image Capturing Apparatus 101

Figure 1:
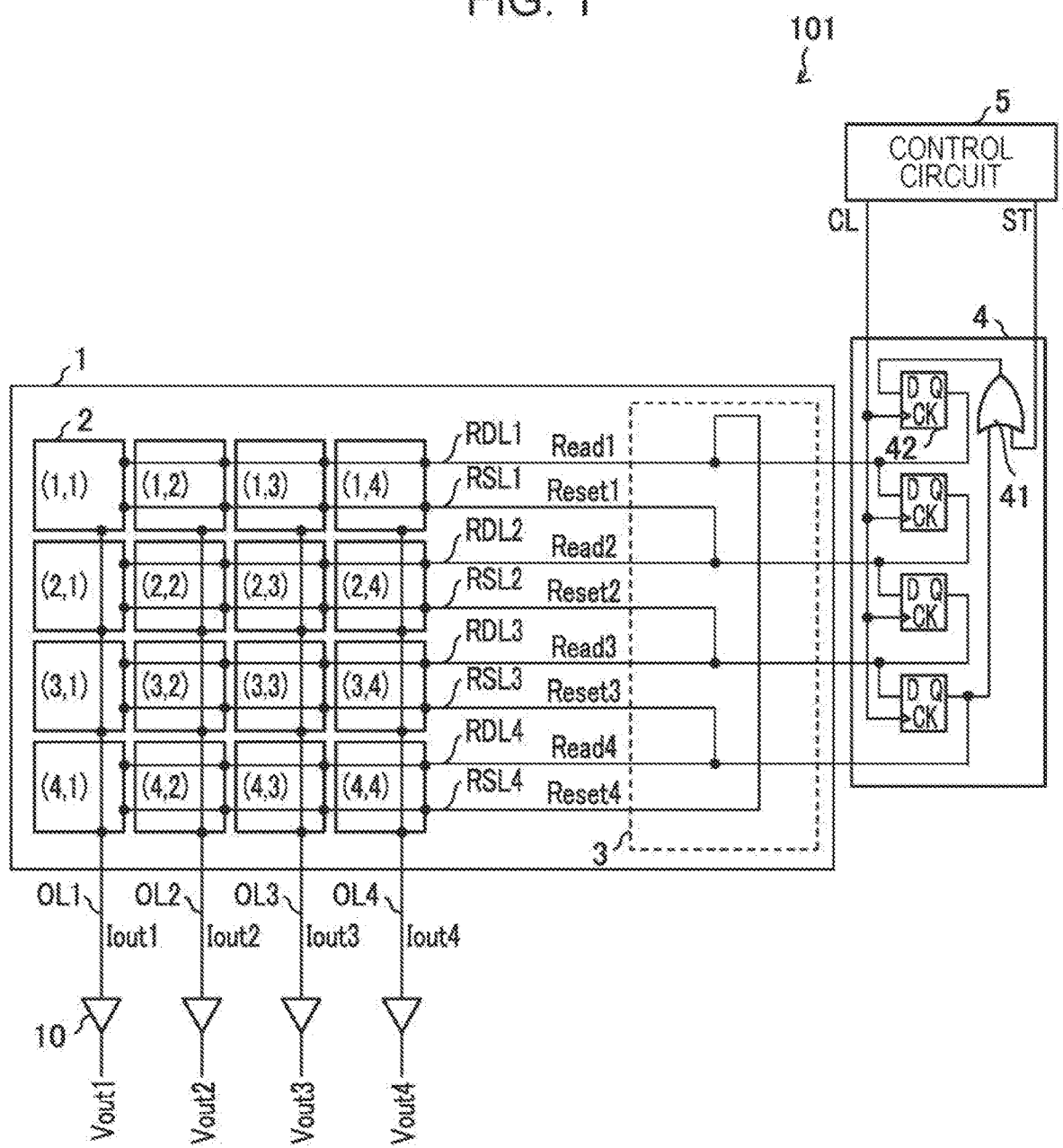
FIG. 1 is a block diagram illustrating a configuration of a radiographic image capturing apparatus according to Embodiment 1 of the present disclosure.

FIG. 1 is a block diagram illustrating a configuration of a radiographic image capturing apparatus 101 according to this embodiment.

As illustrated in FIG. 1, the radiographic image capturing apparatus 101 includes a substrate 1, a plurality of pixels 2, a control signal input unit 3, a shift register 4 (control signal output circuit), and a control circuit 5, and a plurality of current-to-voltage conversion amplifiers 10.

Configuration of Substrate 1

The substrate 1 is a glass substrate (glass panel) but is not limited thereto, and the substrate may be a plastic substrate or the like.

The pixels 2 are formed on the substrate 1, are arranged in a matrix with 4 rows and 4 columns. On the substrate 1, read signal lines RDL1 to RDL4, reset signal lines RSL1 to RSL4, and output lines OL1 to OL3 are formed.

The read signal lines RDL1 to RDL4 are connected to the pixels 2 of the first row to the fourth row, respectively. The read signal lines RDL1 to RDL4 are provided to input read signals Read1 to Read4 (control signals) to the pixels 2, respectively.

The reset signal lines RSL1 to RSL4 are connected to the pixels 2 of the first row to the fourth row respectively. Reset signal lines RSL1 to RSL4 are provided to input reset signals Reset1 to Reset4 (control signals) to the pixels 2, respectively.

In the following description, in a case where the read signal lines RDL1 to RDL4, the read signals Read1 to Read4, the reset signal lines RSL1 to RSL4, and the reset signals Reset1 to Reset4 are representatively described, respectively, these signals are referred to as a read signal line RDL, a read signal Read, a reset signal line RSL, and a reset signal Reset, respectively.

The output lines OL1 to OL4 are connected to the pixels 2 in the first to fourth columns, respectively. The output lines OL1 to OL4 are provided to output currents Iout1 to Iout4 output from the pixels 2, respectively.

In this embodiment, a case where the number of the read signal lines RDL1 to RDL4 and the reset signal lines RSL1 to RSL4 connected to the pixels 2 of each row are respectively one is described as an example, but is not limited to this example. The read signal line RDL and the reset signal line RSL of each row may be plural if reset transistors 115 belonging to the same row can be controlled by same reset signal Reset and read transistors 117 belonging to the same row can be controlled by the same read signal Read. The number of read signal lines RDL and reset signal lines RSL of each row as described above is also applied to Embodiments 2 and 3 described later.

The control signal input unit 3 is provided on the substrate 1. The control signal input unit 3 has a signal transmission path for inputting the read signal Read1 to Read4 output from a first to fourth output stages of the shift register 4 to the read signal line RDL1 to RDL4, respectively. The control signal input unit 3 has a signal transmission path for inputting the read signal Read1 output from the first output stage of the shift register 4 to the reset signal line RSL4. The control signal input unit 3 has a signal transmission path for inputting the read signal Read2 output from the second output stage of the shift register 4 to the reset signal line RSL1. The control signal input unit 3 has a signal transmission path for inputting the read signal Read3 output from the third output stage of the shift register 4 to the reset signal line RSL2. The control signal input unit 3 has a signal transmission path for inputting the read signal Read4 output from the fourth output stage of the shift register 4 to the reset signal line RSL3.

Configuration of Shift Register 4

The shift register 4 includes an OR circuit 41, four D-FFs (D flip-flops) 42. The shift register 4 is formed of, for example, a silicon integrated circuit.

A clock signal CL supplied from the control circuit 5 is input to a clock input terminal of each D-FF 42. The D-FFs 42 of the first to fourth output stages output the read signal Read1 to Read4 from output terminals Q, respectively. The output terminal Q of the D-FF 42 of the first output stage is connected to a data input terminal D of the D-FF 42 of the second output stage. The output terminal Q of the D-FF 42 of the second output stage is connected to the data input terminal D of the D-FF 42 of the third output stage. The output terminal Q of the D-FF 42 of the third output stage is connected to the data input terminal D of the D-FF 42 of the fourth output stage.

A start signal ST supplied from the control circuit 5 is input to one input terminal of the OR circuit 41. The read signal Read4 output from the output terminal Q of the D-FF 42 of the fourth output stage is input to the other input terminal of the OR circuit 41. An output terminal of the OR circuit 41 is connected to the data input terminal D of the D-FF 42 of the first output stage.

Configuration of Control Circuit 5

The control circuit 5 outputs a clock signal CL of a fixed cycle. The control circuit 5 outputs a pulse-like start signal ST only once when the radiographic image capturing apparatus 101 is activated. The control circuit 5 controls the operation timing of the shift register 4 by supplying the start signal ST and the clock signal CL to the shift register 4.

Configuration of Current-to-Voltage Conversion Amplifier 10

The current-to-voltage conversion amplifiers 10 are provided on the output lines OL1 to OL4 connected to the output terminals of the pixels 2 of each column. The current-to-voltage conversion amplifiers 10 convert the currents Iout1 to Iout4 to be output to the respective output lines OL1 to OL4 to output voltages Vout1 to Vout4, respectively.

The output voltages Vout1 to Vout4 are output to a data processing unit (not illustrated). In the data processing unit, predetermined processing is performed based on 4×4 output voltages Vout1 to Vout4, thereby obtaining a two-dimensional image of captured radiographic image with 4×4 resolution.

Configuration of Pixel 2

Figure 2:
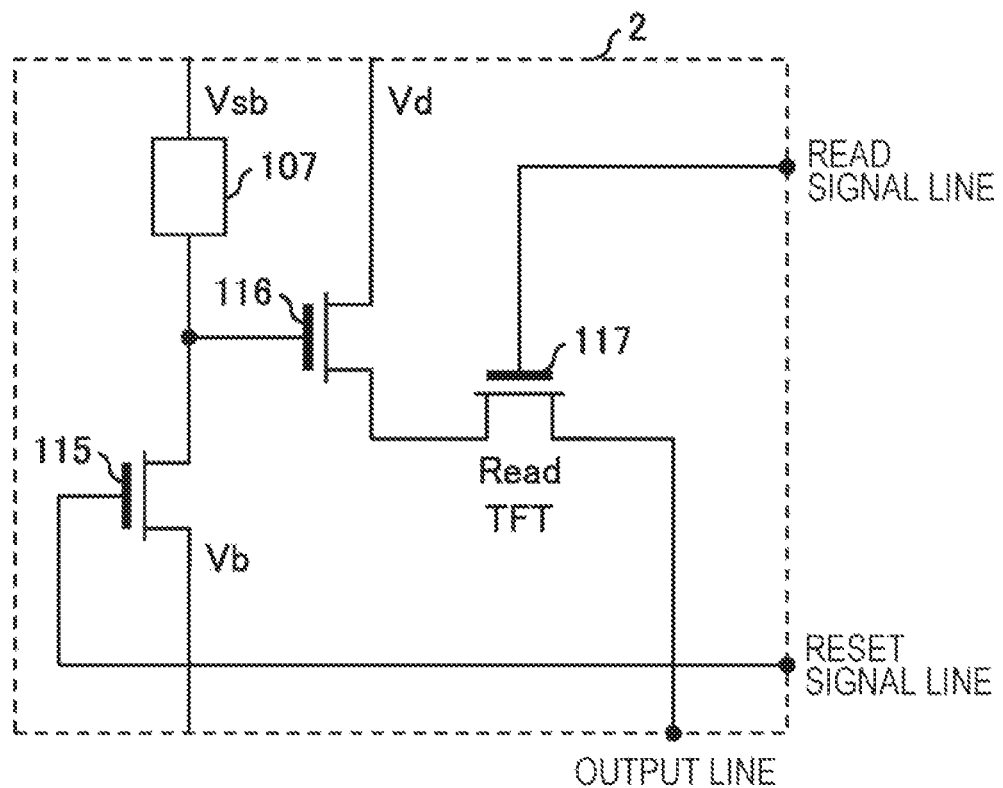
FIG. 2 is a circuit diagram illustrating a circuit configuration of a pixel provided in the radiographic image capturing apparatus.

FIG. 2 is a circuit diagram illustrating a circuit configuration of the pixel 2 provided in the radiographic image capturing apparatus 101.

As illustrated in FIG. 2, in the pixel 2, a sensor element 107, a reset transistor 115 (second switching element), an amplifier transistor 116, and a read transistor 117 (first switching element) are provided.

The sensor element 107 is an element that directly converts radiation, particularly X-ray, into an electric signal (electrical charge or hole), and generates an electric signal corresponding to the dose of the incident radiation. As illustrated, a bias voltage Vsb is applied to one end of the sensor element 107 in the pixel 2.

When radiation is incident on the pixel 2, as the electric signal is generated in the sensor element 107, a voltage of a gate electrode of the amplifier transistor 116 connected to the sensor element 107 changes. This is because an electric signal is accumulated as an electrical charge in electrostatic capacitance connected to the gate electrode of the amplifier transistor 116. This electrostatic capacitance is electrostatic capacitance between the gate electrode of the amplifier transistor 116 and a portion (for example/bias voltage input terminal of the sensor element 107) having fixed potential. Specifically, this electrostatic capacitance is formed by parasitic capacitance of the gate electrode of the amplifier transistor 116, capacitance between the terminals of the sensor element 107, and the like.

Accordingly, the amplifier transistor 116 outputs voltage change in the gate electrode due to the electric signal as current change between a drain and a source thereof. In other words, the amplifier transistor 116 reads a value of the current flowing between a source electrode and a drain electrode of the amplifier transistor 116 based on the voltage change of the gate electrode of the amplifier transistor 116 due to the electric signal.

In the reset transistor 115, the reset signal Reset is supplied to the gate electrode through the reset signal line RSL, and a reset voltage Vb is applied to the source electrode from the outside of the pixel 2 through a reset voltage line. The reset transistor 115 controls the gate electrode of the amplifier transistor 116 and the drain electrode of the reset transistor 115 to a conduction state or an interruption state based on the presence or absence of the reset signal Reset. The reset transistor 115 resets the pixel 2 by making the gate electrode of the amplifier transistor 116 and the drain electrode of the reset transistor 115 conductive so that the potential of the gate electrode of the amplifier transistor 116 becomes the reset voltage vb.

The amplifier transistor 116 is a transistor that amplifies the electric signal, and its power supply voltage is Vd.

The read transistor 117 is a switching element for outputting the drain-source current of the amplifier transistor 116 to the outside of the pixel 2 through the output lines OL1 to OL4. The read transistor 117 is controlled based on the read signal Read supplied through the read signal line RDL.

Operation of Radiographic Image Capturing Apparatus 101

Figure 3:
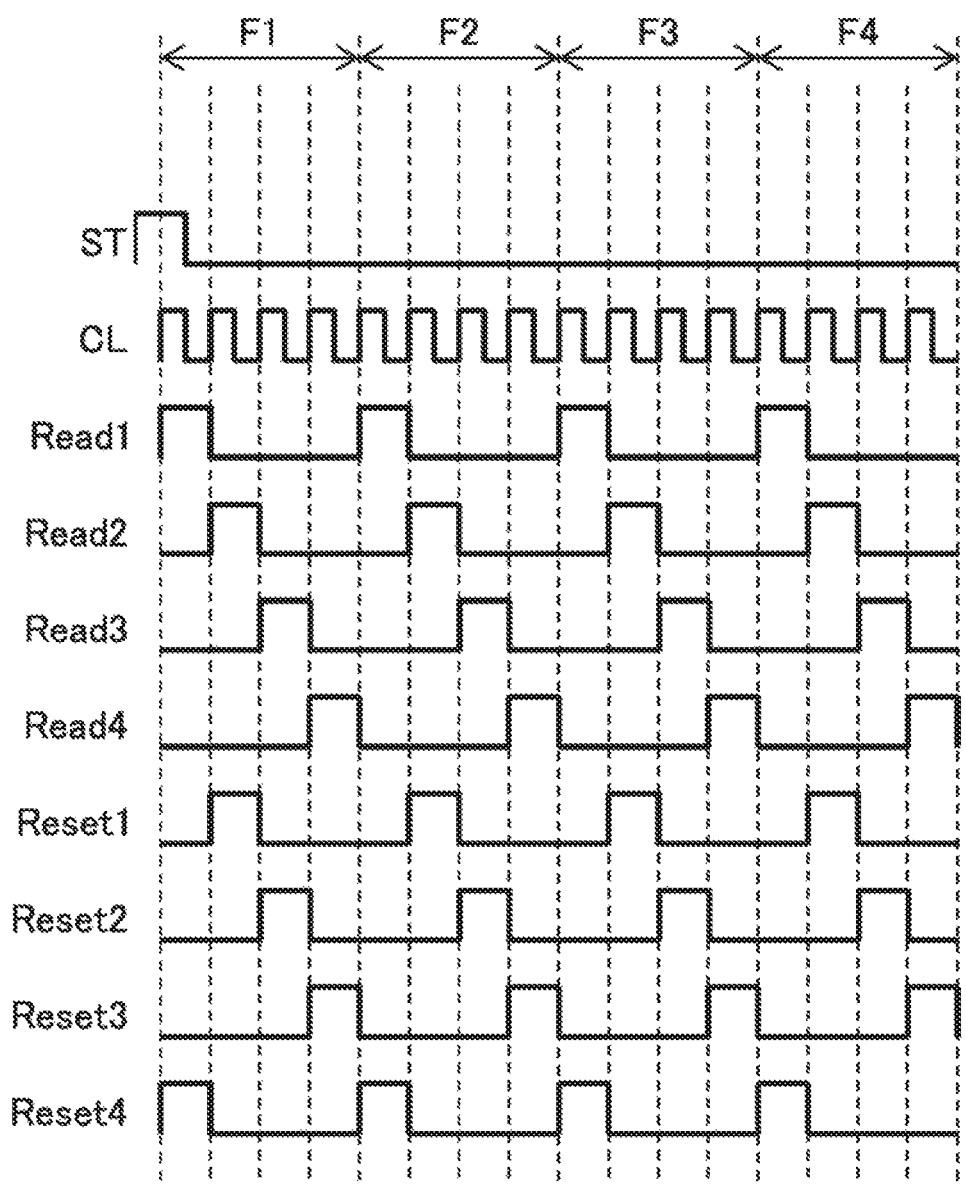
FIG. 3 is a timing chart illustrating an operation of the radiographic image capturing apparatus.

FIG. 3 is a timing chart illustrating an operation of the radiographic image capturing apparatus 101.

As illustrated in FIG. 3, the shift register 4 supplies the read signals Read1 to Read4 to the pixels 2 of each row by inputting the output signals output from the first to fourth output stages as the read signals Read1 to Read4 to the read signal lines RDL1 to RDL4, respectively, through the control signal input unit 3. With this configuration, in each of frames F1 to F4, signal reading of each row is performed at a timing shifted by one clock of the clock signal CL.

Specifically, the read transistors 117 in the four pixels 2 ((1, 1) to (1, 4)) belonging to the first row are controlled by the read signal Read1. The read transistors 117 in the four pixels 2 ((2, 1) to (2, 4)) belonging to the second row are controlled by the read signal Read2. The read transistors 117 in the four pixels 2 ((3, 1) to (3, 4)) belonging to the third row are controlled by the read signal Read3. The read transistors 117 in the four pixels 2 ((4, 1) to (4, 4)) belonging to the fourth row are controlled by the read signal Read4.

On the other hand, the shift register 4 supplies the reset signals Reset1 to Reset4 to the pixel 2 of each row by inputting the reset signals Reset1 to Reset4 to the reset signal lines RSL1 to RSL4, respectively, through the control signal input unit 3. Accordingly, the reset transistors 115 in the four pixels 2 ((1, 1) to (1, 4)) belonging to the first row are controlled by the reset signal Reset1. The reset transistors 115 in the four pixels 2 ((2, 1) to (2, 4)) belonging to the second row are controlled by the reset signal Reset2. The reset transistors 115 in the four pixels 2 ((3, 1) to (3, 4)) belonging to the third row are controlled by the reset signal Reset3. The reset transistors 115 in the four pixels 2 ((4, 1) to (4, 4)) belonging to the fourth row are controlled by the reset signal Reset4.

The shift register 4 determines an output signal to be output from each output stage based on the start signal ST and the clock signal CL from the control circuit 5. When the start signal ST becomes High, the shift register 4 outputs an output signal which is shifted by one clock of the clock signal CL from each output stage in synchronization with the clock signal CL. The control signal input unit 3 inputs respective output signals to the read signal lines RDL1 to RDL4 as a row selection signal for sequentially selecting each row of the pixels 2.

With this configuration, as illustrated in FIG. 3, in each of the frames F1 to F4 for which signal reading of all the pixels 2 is performed, the read signals Read1 to Read4 which are shifted by one clock are applied to the pixels 2 of each row.

The control signal input unit 3 inputs the output signal of the first output stage of the shift register 4 to the reset signal line RSL4 as the reset signal Reset4. The control signal input unit 3 inputs the output signal of the second output stage of the shift register 4 to the reset signal line RSL1 as the reset signal Reset1. The control signal input unit 3 inputs the output signal of the third output stage of the shift register 4 to the reset signal line RSL2 as the reset signal Reset2. The control signal input unit 3 inputs the output signal of the fourth output stage of the shift register 4 to the reset signal line RSL3 as the reset signal Reset3.

With this configuration, as illustrated in FIG. 3 the reset signals Reset1 to Reset4 output at a timing shifted by one clock with respect to the read signals Read1 to Read1, respectively, are provided to the pixels 2 of each row.

In the radiographic image capturing apparatus 101 the pixels 2 of each row are reset by the reset signals Reset1 to Reset4 output as described above, respectively, after reading the signal. With this configuration, the signal read cut next from the pixels 2 becomes a signal having magnitude corresponding to an electrical charge amount of the electrical charges accumulated by radiation until being read from the resetting.

Effect of Radiographic Image Capturing Apparatus 101

In the radiographic image capturing apparatus 101 of this embodiment, the read signal Read for reading the electric signal from the pixels 2 of the same row and the reset signal Reset for resetting the other pixels 2 of the same row are the same. Specifically, the read signal Read1 for reading the pixels 2 of the first row and the reset signal Reset4 for resetting the pixels 2 of the fourth row are the same. The read signal Read2 for reading the pixels 2 of the second row and the reset signal Reset1 for resetting the pixels 2 of the first row are the same. The read signal Read3 for reading the pixels 2 of the third row and the reset signal Reset2 for resetting the pixels 2 of the second row are the same. The read signal Read4 for reading the pixels 2 of the fourth row and the reset signal Reset3 for resetting the pixels 2 of the third row are the same.

With this configuration, the resetting (initialization) of the pixels 2 of each row is performed during a period in which the signals are being read from the pixels 2 of the next row. Therefore, the period for resetting is not provided in a period different from the period for signal reading. Accordingly, an imaging operation can be repeated in a short time.

A combination in which the read signal Read for reading the electric signal from the pixels 2 of the same row and the reset signal Reset for resetting the pixels 2 of the other same row are the same is not limited to the example described above.

The control signal input unit 3 has only a signal input path for inputting the output signals output from the respective output stages of the shift register 4 to the reset signal lines RSL1 to RSL4 as described above. Therefore, an AND circuit and a switching element included in the control signal generation circuit in the radiographic image capturing apparatus disclosed in International Publication No. 2017/013963 may not be included. Accordingly, the circuit configuration of the radiographic image capturing apparatus can be simplified.

Embodiment 2

Embodiment 2 of the present disclosure will be described with reference to FIGS. 4 and 5. For convenience of explanation, the same reference numerals are attached to constituent elements having the same functions as the constituent elements described in Embodiment 1, and description thereof is omitted.

Configuration of Radiographic Image Capturing Apparatus 102

Figure 4:
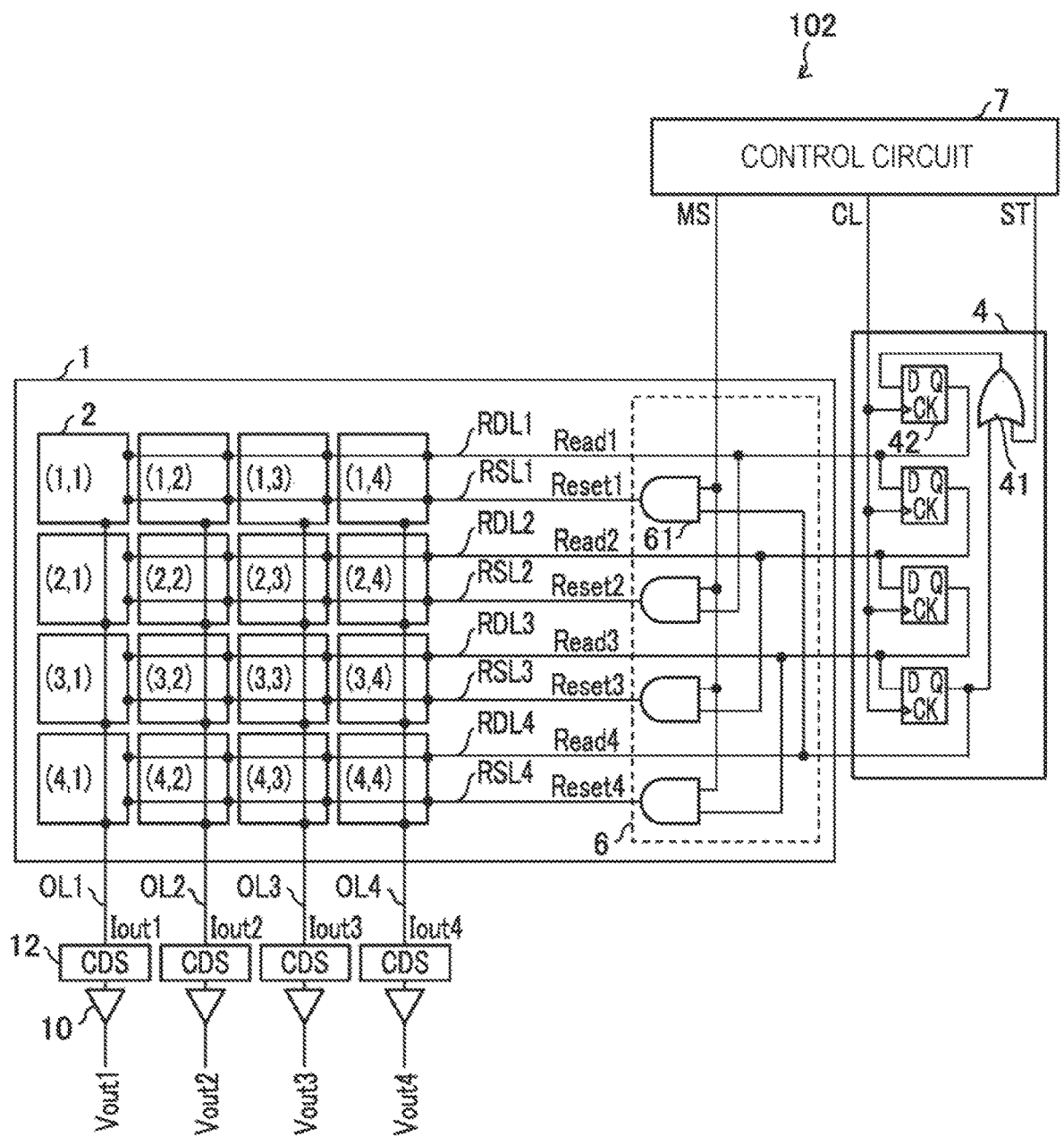
FIG. 4 is a block diagram illustrating a configuration of a radiographic image capturing apparatus according to Embodiment 2 of the present disclosure.

FIG. 4 is a block diagram illustrating a configuration of a radiographic image capturing apparatus 102 according to this embodiment.

As illustrated in FIG. 4, the radiographic image capturing apparatus 102 includes the substrate 1, the plurality of pixels 2, the shift register 4, a reset signal generation circuit 6 (control period limitation circuit), a control circuit 7, the plurality of current-to-voltage conversion amplifiers 10, and correlated double sampling (CDS) circuits 12 (difference circuits).

Configuration of Reset Signal Generating Circuit 6

The reset signal generation circuit 6 is provided on the substrate 1. The reset signal generation circuit 6 has a signal transmission path for outputting the read signals Read1 to Read4 output from the first to fourth output stages of the shift register 4 to the read signal lines RDL1 to RDL4, respectively. The reset signal generation circuit 6 includes four AND circuits 61.

The AND circuits 61 corresponds to the reset signal line RSL1 to RSL4, respectively. The output terminal of the AND circuit 61 corresponding to the reset signal line RSL1 is connected to the reset signal line RSL1. The output terminal of the AND circuit 61 corresponding to the reset signal line RSL2 is connected to the reset signal line RSL2. The output terminal of the AND circuit 61 corresponding to the reset signal line RSL3 is connected to the reset signal line RSL3. The output terminal of the AND circuit 61 corresponding to the reset signal line RSL4 is connected to the reset signal line RSL4.

A mode selection signal MS supplied from the control circuit 7 is input to one input terminal of each AND circuit 61. The output signal of the fourth output stage of the shift register 4 is input to the other input terminal of the AND circuit 61 corresponding to the reset signal line RSL1. The output signal of the first output stage of the shift register 4 is input to the other input terminal of the AND circuit 61 corresponding to the reset signal line RSL2. The output signal of the second output stage of the shift register 4 is input to the other input terminal of the AND circuit 61 corresponding to the reset signal line RSL3. The output signal of the third output stage of the shift register 4 is input to the other input terminal of the AND circuit 61 corresponding to the reset signal line RSL4.

Configuration of CDS Circuit 12

The CDS circuit 12 removes noise generated in each pixel 2 by resetting, by taking the difference between two electrical signals read from the pixels 2 of the same row in two consecutive frames.

Operation of Radiographic Image Capturing Apparatus 102

Figure 5:
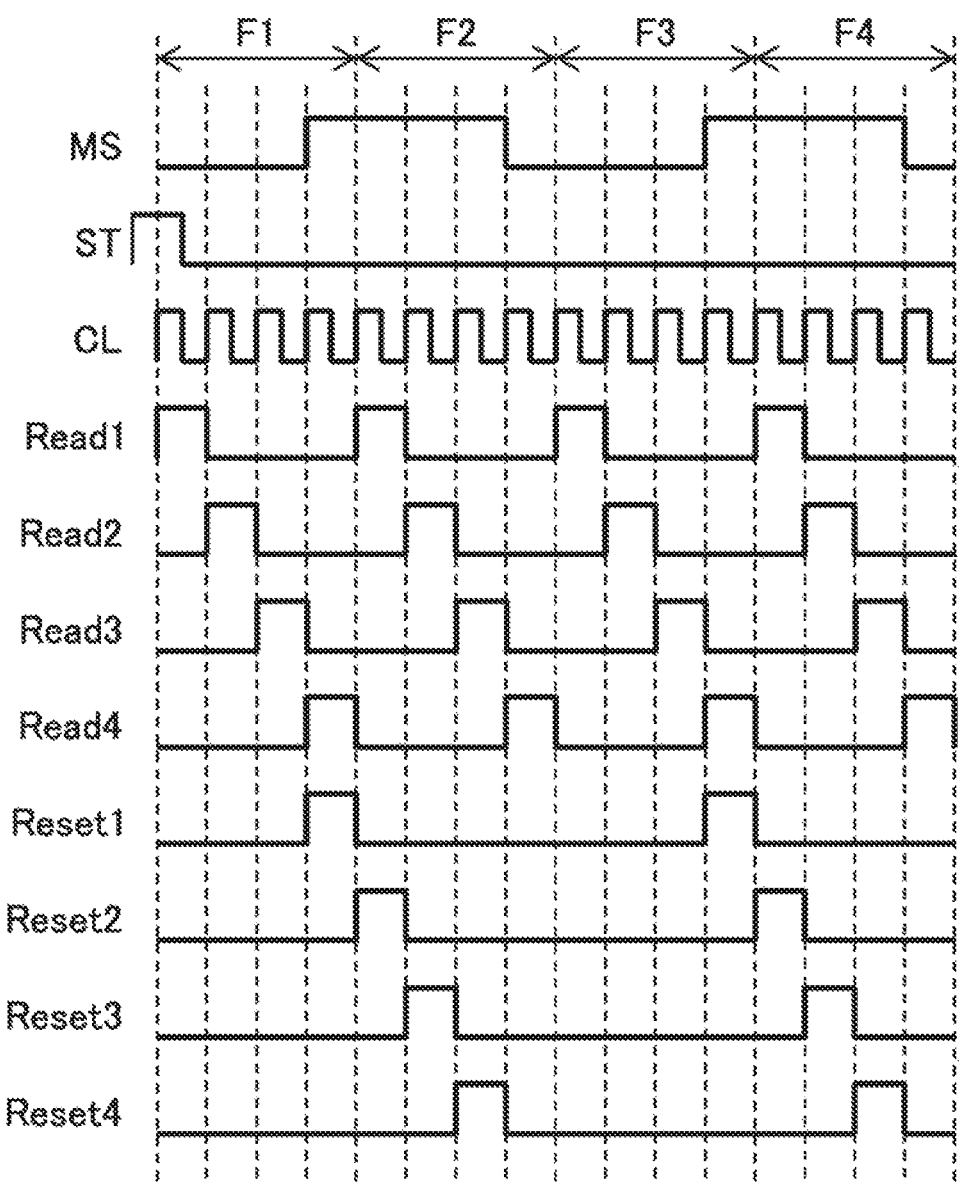
FIG. 5 is a timing chart illustrating an operation of the radiographic image capturing apparatus illustrated in FIG. 4.

FIG. 5 is a timing chart illustrating an operation of the radiographic image capturing apparatus 102.

As illustrated in FIG. 5, the shift register 4 supplies the read signals Read1 to Read4 to the pixels 2 of each row by inputting the output signals output from the first to fourth output stages as the read signals Read1 to Read4 to the read signal lines RDL1 to RDL4, respectively, through the reset signal generation circuit 6. With this configuration, similarly to the radiographic image capturing apparatus 101 of Embodiment 1, signal reading is performed at the above timing in each of the frames F1 to F4.

The mode selection signal MS is controlled to be "High" for one frame period from the time when a row immediately before a row where a reading period of each of the even-numbered frames F2 and F4 is started is selected. Accordingly, in this period, since the reset signal Reset is output without being interrupted by the AND circuit 61, resetting of the pixel 2 is performed.

The reset signal generation circuit 6 outputs the reset signals Reset1 to Reset4 so that the pixels 2 of the row to be read next are reset during the period in which the pixels 2 of a certain row are read. Specifically, the pixels 2 of the first row are reset by the reset signal Reset1 during the period in which the pixels 2 of the fourth row are being read by the read signal Read4. The pixels 2 of the second row are reset by the reset signal Reset2 during the period in which the pixels 2 of the first row are being read by the read signal Read1. The pixels 2 of the third row are reset by the reset signal Reset3 during the period in which the pixels 2 of the second row are being read by the read signal Read2. The pixels 2 of the fourth row are reset by the reset signal Reset4 during the period in which the pixels 2 of the third row are being read by the read signal Read3.

With this configuration, in the even-numbered frames F2 and F4, the signals of the pixels 2 of the first row to the fourth row are read immediately after the pixels 2 of the first row to the fourth row are reset, and the pixels 2 of the second to fourth rows are reset. On the other hand, in the odd-numbered frames F1 and F3, the signals of the pixels 2 of the first row to the fourth row are read, but the pixels 2 of the second row to the fourth row are not reset. However, the pixels 2 of the first row are reset by outputting the reset signal Reset1 from the reset signal generation circuit 6 (AND circuit 61) only during the last period of each of the odd-numbered frames F1 and F3.

Effect of Radiographic Image Capturing Apparatus 102

In the radiographic image capturing apparatus 102 of this embodiment, the read signal Read for reading the electric signal from the pixels 2 of the same row is the same as the reset signal Reset for resetting other pixels 2 of the same row. Specifically, the read signal Read1 for reading the pixels 2 of the first row and the reset signal Reset2 for resetting the pixels 2 of the second row are the same. The read signal Read2 for reading the pixels 2 of the second row and the reset signal Reset3 for resetting the pixels 2 of the third row are the same. The read signal Read3 for reading the pixels 2 of the third row and the reset signal Reset4 for resetting the pixels 2 of the fourth row are the same. The read signal Read4 for reading the pixels 2 of the fourth row and the reset signal Reset1 for resetting the pixels 2 of the first row are the same.

The reset signals Reset1 to Reset4 are respectively obtained as logical products of "High" of the mode selection signal MS and the respective read signals Read4, Read1, Read2, and Read3, by the AND circuit 61. Therefore, it can be said that the reset signals Reset1 to Reset4 are substantially the same as these read signals Read.

In the radiographic image capturing apparatus 101, the resetting of the pixels 2 of each row is performed for the pixels 2 of the row to be read next in the period during which the pixels 2 of a certain row are read by the reset signals Reset1 to Reset4 output as described above. With this configuration, the period for the resetting is not provided in a period different from the period for signal reading. Accordingly, the imaging operation can be repeated in a short time.

The period during which the reset signal Reset is provided to the pixels 2 is limited by the AND circuit 61. Specifically, the reset signal Reset is output only during the period when the mode selection signal MS is "High". With this configuration, after reading (outputting) of the electric signal from each pixel 2 of the same row is performed twice consecutively, the reset signal Reset is provided to each pixel 2 of the same row.

Signals read from the pixels 102 of each row are signals obtained by adding signals generated by radiation subsequently after the resetting in the preceding frame.

The CDS circuit 12 subtracts the value of the electric signal read from the same pixel 2 in the previous even-numbered frame (for example, frame F2) from the value of the electric signal read from the pixels 2 of each row in the odd-numbered frame (for example, frame F3). With this configuration, it is possible to calculate an amount of change in the value of the electrical signal generated by radiation during consecutive two readings for the same pixel 2. As such, a method of calculating the change amount of the electric signal while being output twice from the same pixel 2 is well known as correlated double sampling (CDS). As such, the change amount is calculated so as to make it possible to remove noise generated in each pixel 2 by resetting, thereby capable of acquiring an image with small noise.

In contrast, in the CDS of the related art, in a case where a resetting period for performing the resetting and a reading period for reading the electric signal do not overlap in time, at least three periods (the resetting period, the first reading period and the second reading period) may be used for CDS processing. With this configuration, image data is generated by subtracting the read value of the first reading period from the read value of the second reading period.

According to the radiographic image capturing apparatus 102 of this embodiment, since the resetting period and the first reading period substantially overlap, it is possible to shorten the time taken for image generation is reduced to two thirds of the example taken for the three periods described above.

As another CDS of the related art, there is also a method of generating image data by subtracting the read value of the first reading period from the read value of the second reading period by allowing the CDS to be operated in the order of the first resetting period, the first reading period, the X-ray irradiation start, the second resetting period, and the second read period. In this method, the time taken for image generation further increases, and since the two read values between which the difference is taken are values after separate resetting, noise by resetting may not be removed.

In this embodiment, as illustrated in FIG. 5, the electrical signal is continuously read from the pixels 2 of the same row from the odd-numbered frame to the subsequent even-numbered frame. The present disclosure is not limited thereto. The electric signal may be continuously read from the pixel 2 of the same row from the even-numbered frame to the subsequent odd-numbered frame.

Embodiment 3

When description is made on Embodiment 3 of the present disclosure with reference to FIG. 6, the description is as follows. For convenience of explanation, the same reference numerals are attached to constituent elements having the same functions as the constituent elements described in Embodiment 1 and Embodiment 2, and description thereof is omitted.

Configuration of Radiographic Image Capturing Apparatus 103

Figure 6:
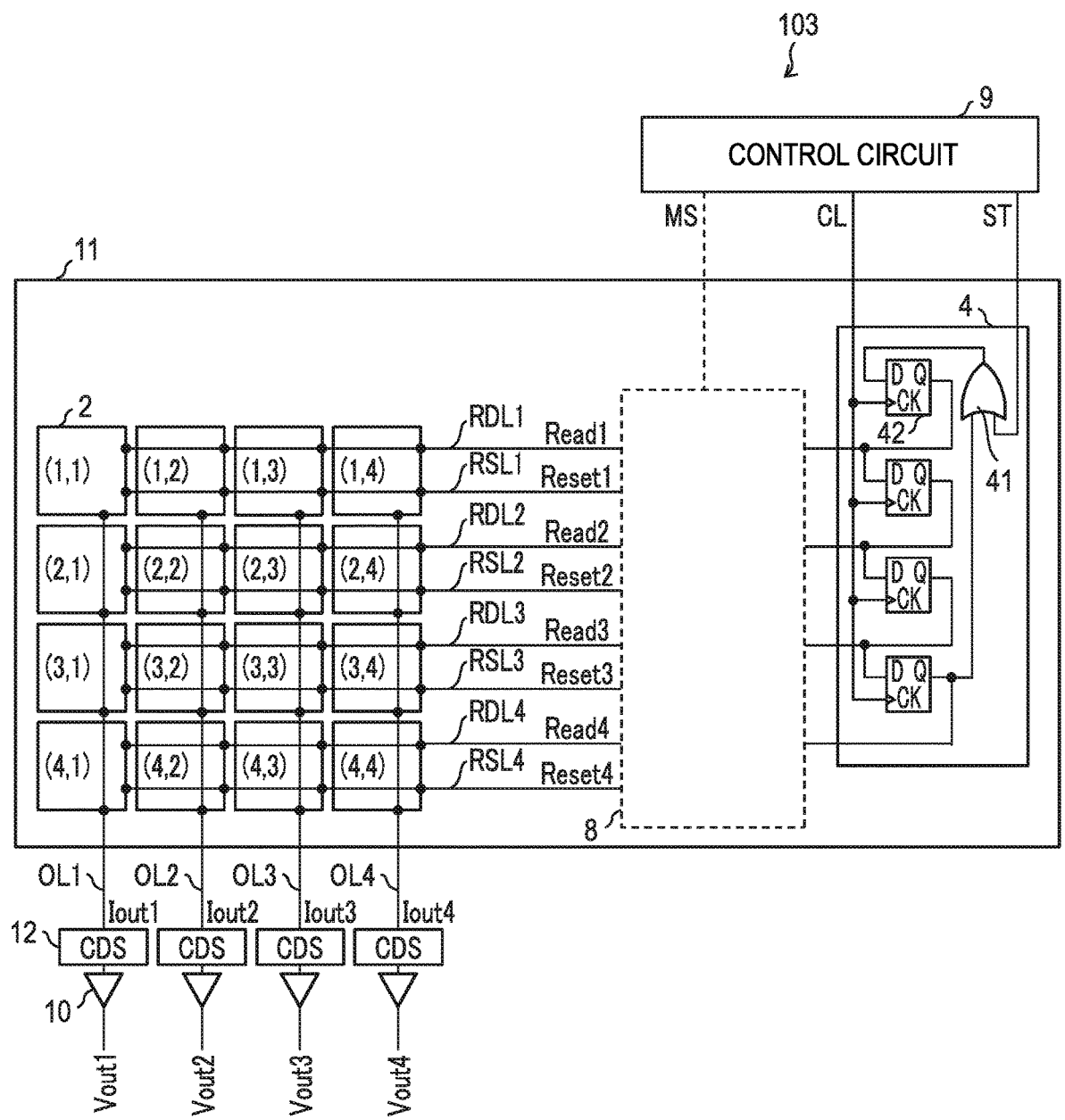
FIG. 6 is a block diagram illustrating a configuration of a radiographic image capturing apparatus according to Embodiment 3 of the present disclosure.

FIG. 6 is a block diagram illustrating a configuration of the radiographic image capturing apparatus 103 according to this embodiment.

As illustrated in FIG. 6, the radiographic image capturing apparatus 103 includes the plurality of pixels 2, the shift register 4, a control signal input unit 8, a control circuit 9, the plurality of current-to-voltage conversion amplifiers 10, a substrate 11, and the CDS circuits 12.

Configuration of Substrate 11

The substrate 11 is a glass substrate (glass panel), but is not limited thereto, and the substrate may be a plastic substrate or the like.

The pixels 2 are formed on the substrate 11, are arranged in a matrix with 4 rows and 4 columns. On the substrate 11, the read signal lines RDL1 to RDL4, the reset signal lines RSL1 to RSL4, and the output lines OL1 to OL3 are formed.

The control signal input unit 8 is provided on the substrate 11. Based on the output signals output from the respective output stages of the shift register 4, the control signal input unit 8 inputs the read signals Read1 to Read4 to the read signal lines RDL1 to RDL4, respectively, and inputs the reset signal Reset1 to Reset4 to the reset signal lines RSL1 to RSL4, respectively. The control signal input unit 8 is the control signal input unit 3 in Embodiment 1 or the reset signal generation circuit 6 in Embodiment 2.

The shift register 4 is formed on the substrate 11.

Configuration of Control Circuit 9

The control circuit 9 is the control circuit 5 in Embodiment 1 or the control circuit 7 in Embodiment 2.

Effect of Radiographic Image Capturing Apparatus 103

In the radiographic image capturing apparatus 103, the shift register 4 is formed on the substrate 11. Thus, the shift register 4 can be formed on the substrate 11 by the same process as the transistor forming the pixel 2. With this configuration, the shift register 4 may not be provided outside the substrate 1 in the form of a silicon integrated circuit or the like as Embodiment 1 and 2. A signal connection line may not be provided between the substrate 11 and the shift register 4. Accordingly, the manufacturing cost of the radiographic image capturing apparatus 103 can be reduced.

In the case where a pitch between the pixels 2 is narrow and it is difficult to provide the shift register 4 having the output terminal corresponding to such a narrow pixel pitch on the substrate 1, as in Embodiment 1 or 2, it is preferable that the shift register 4 is provided outside the substrate 11.

Summarization

A radiographic image capturing apparatus according to an aspect 1 of the present disclosure includes a substrate 1 or 11 in which pixels 2 are arranged in a matrix, the pixels 2 each including a sensor element 107 for generating an electrical signal corresponding to a dose of an incident radiation, a first switching element (read transistor 117) for outputting the electrical signal, and a second switching element (reset transistor 315) for performing initialization, and a control signal output circuit that outputs a control signal (read signals Read1 to Read4) for sequentially selecting pixels 2 of each row, in which a control signal (read signals Read1 to Read4) used to control first switching elements in pixels 2 of a row and a control signal (reset signals Reset1 to Reset4) used to control second switching elements in pixels 2 of another row are identical.

According to the configuration described above, initialization can be performed by controlling the second switching elements in the pixels of the same row in the electric signal reading period in which the first switching elements of the pixels of the same row are controlled. Therefore, the initialization period is not provided in a period different from the reading period. Accordingly, the imaging operation can be repeated in a short time.

In the aspect 1, the radiographic image capturing apparatus according to an aspect 2 of the present disclosure may further include a control period limitation circuit (reset signal generation circuit 6) that provides the control signal to second switching elements for a limited period.

According to the configuration described above, it is possible to provide a period for performing the initialization and a period for not performing the initialization as circumstances demanded.

In the aspect 2, in the radiographic image capturing apparatus according to an aspect 3 of the present disclosure, the control period limitation circuit may provide the control signal to the second switching elements after an electrical signal is consecutively output twice from each pixel 2 of a row, and the radiographic image capturing apparatus may further include a difference circuit (CDS circuit 12) that takes a difference between the electrical signals output twice from the pixel of the row.

According to the configuration described above, it is possible to generate an image by performing CDS processing in a short reading period.

In any one of the aspects 1 to 3, in the radiographic image capturing apparatus according to an aspect 4 of the present disclosure, the control signal output circuit may be formed outside the substrate 1.

The configuration described above can be suitably used, for example, in a case where the pitch of the pixel is narrow and it is difficult to provide a control signal output circuit having output terminals corresponding to such a narrow pixel pitch on the substrate.

In any one of the aspects 1 to 3, in the radiographic image capturing apparatus according to an aspect 5 of the present disclosure, the control signal output circuit may be formed on the substrate 11.

According to the configuration described above, the control signal output circuit may not be provided outside the substrate, for example, in the form of a silicon integrated circuit or the like. The signal connection line may not be provided between the substrate and the control signal output circuit.

Supplementary Matters

The present disclosure is not limited to the respective embodiments described above, and various modifications may be made thereto within the scope set forth in the claims, and embodiments obtained by appropriately combining technical means respectively disclosed in different embodiments are also included in the technical scope of the present disclosure. Furthermore, new technical features can be formed by combining technical means disclosed in the respective embodiments.

The present disclosure contains subject matter related to that disclosed in Japanese Priority Patent Application JP 2018-085765 filed in the Japan Patent Office on Apr. 26, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A radiographic image capturing apparatus comprising:
   a substrate in which pixels are arranged in a matrix, the pixels each including a sensor element for generating an electrical signal corresponding to a dose of an incident x-ray radiation, a first switching element for outputting the electrical signal, and a second switching element for performing initialization; and
   a control signal output circuit that outputs a control signal for sequentially selecting pixels of each row,
   a control signal used to control first switching elements in pixels of a row and a control signal used to control second switching elements in pixels of another row are identical, wherein
   a control period limitation circuit provides the control signal to second switching elements for a limited period,
   the control period limitation circuit provides the control signal to the second switching elements after an electrical signal is consecutively output twice from each pixel of a row, and
   the radiographic image capturing apparatus further comprises a difference circuit that takes a difference between the electrical signals continuously output twice from the pixel of the row.

2. The radiographic image capturing apparatus according to claim 1, wherein the control signal output circuit is formed outside the substrate.

3. The radiographic image capturing apparatus according to claim 1, wherein the control signal output circuit is formed on the substrate.

4. A radiographic image capturing apparatus comprising:
   a substrate in which pixels are arranged in a matrix, the pixels each including a sensor element for generating an electrical signal corresponding to a dose of an incident x-ray radiation, a first switching element for outputting the electrical signal, and a second switching element for performing initialization;
   a control signal output circuit that outputs a control signal for sequentially selecting pixels of each row;
   a control signal used to control first switching elements in pixels of a row and a control signal used to control second switching elements in pixels of another row are identical, and
   a control period limitation circuit that provides the control signal to second switching elements for a limited period, wherein the control period limitation circuit provides the control signal to the second switching elements after an electrical signal is consecutively output twice from each pixel of a row.

5. The radiographic image capturing apparatus according to claim 4, wherein the control signal output circuit is formed outside the substrate.

6. The radiographic image capturing apparatus according to claim 4, wherein the control signal output circuit is formed on the substrate.

* * * * *